United States Patent

[11] 3,598,104

| [72] | Inventor | Richard M. Trostler |
| | | 1730 Woodbend Road, Claremont, Calif. 91711 |
| [21] | Appl. No. | 23,679 |
| [22] | Filed | Mar. 30, 1970 |
| [45] | Patented | Aug. 10, 1971 |

[54] SOLAR HEATING SYSTEM FOR SWIMMING POOLS
8 Claims, 3 Drawing Figs.

| [52] | U.S. Cl. | 126/271 |
| [51] | Int. Cl. | F24j 3/02 |
| [50] | Field of Search | 126/270, 271 |

[56] References Cited
UNITED STATES PATENTS
3,072,920  1/1963  Yellott .................. 126/271 X
3,411,163  11/1968  Myers, Jr. .................. 126/271 X
FOREIGN PATENTS
143,621  12/1961  U.S.S.R. .................. 126/271

*Primary Examiner*—Charles J. Myhre
*Attorney*—Bernard V. Ousley

ABSTRACT: A solar heating system for swimming pools, particularly self-supporting above ground swimming pools, in which system a pool cover is used to absorb solar heat and conduct same to surface water in the pool, a pump is used to draw off the heated surface water and circulate it to subsurface areas in the pool to mix the heated surface water with cooler subsurface water, a temperature sensing probe and associated electrical circuitry is used to compare surface water temperature with subsurface water temperature, and the pump is activated when the sensing probe detects a surface water temperature higher than subsurface water temperature.

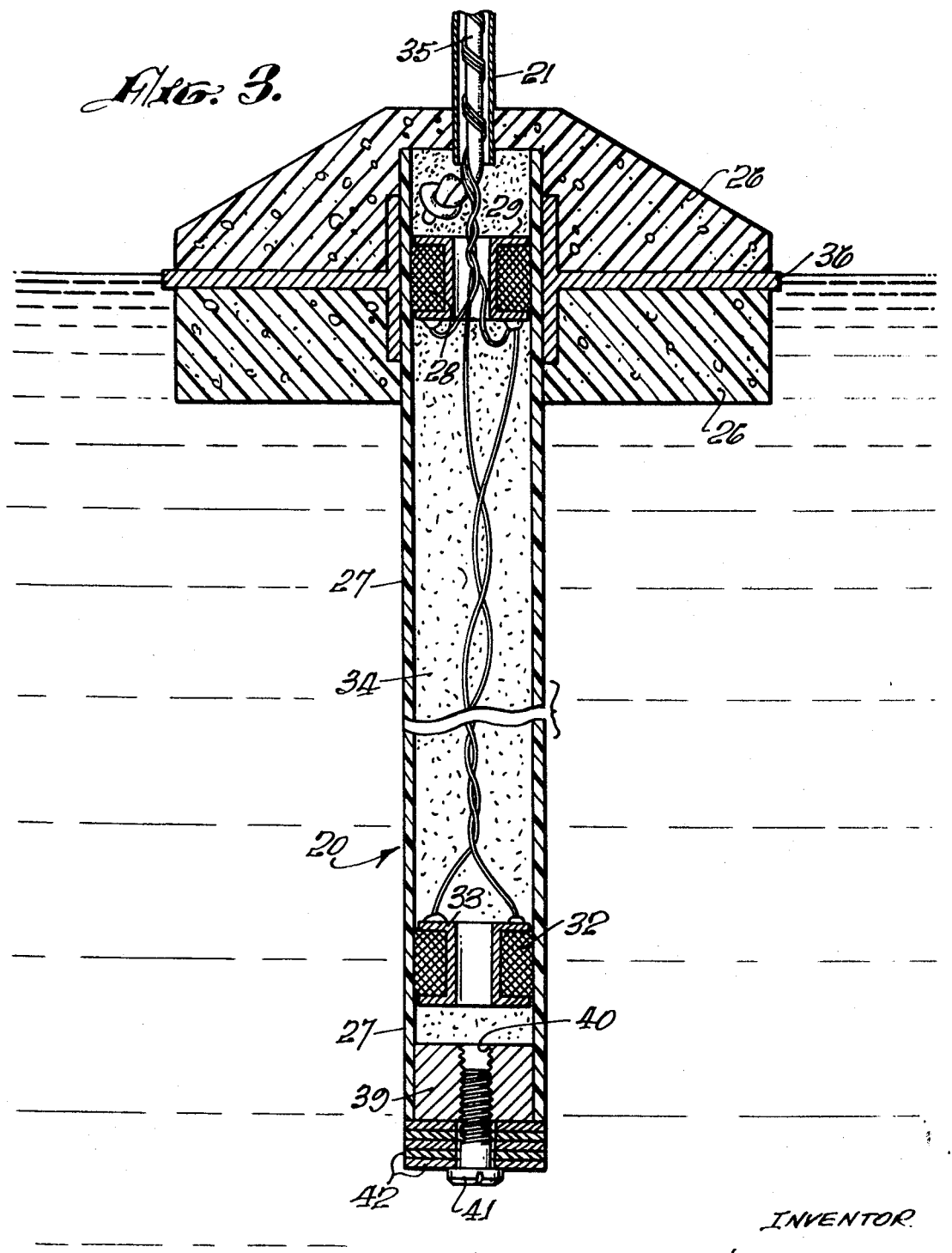

SOLAR HEATING SYSTEM FOR SWIMMING POOLS

The present invention relates to solar heating systems for swimming pools and, while not limited thereto, is ideally suited for self-supporting above ground type of swimming pools frequently erected by families in their family yards, and which pools can be repeatedly erected and dismantled. The usual above ground pool is a frame type structure of metal or the like which supports a plastic liner, which liner forms the sidewalls and bottom of the pool.

Prior solar heaters for swimming pools have shown themselves to be expensive, some of them involving the use of considerable amounts of piping, while others utilize complicated pool covers having panels and conduits. Further, the prior systems are generally manually operated or have their operation controlled by time clock.

The present invention, by contrast, is a very economical solar heating system that involves no complicated panel-type pool covers and no substantial piping installations. Further, the system is automatic, not manually operated or controlled by time clock, with its automatic operation controlled by the temperatures in the pool water. Still other advantages will become apparent from the detailed description of the invention and accompanying drawings wherein:

FIG. 3 is a cross-sectional view of the temperature sensing probe that is part of the present invention, with the probe shown in position in the water of a swimming pool.

Figure 1:
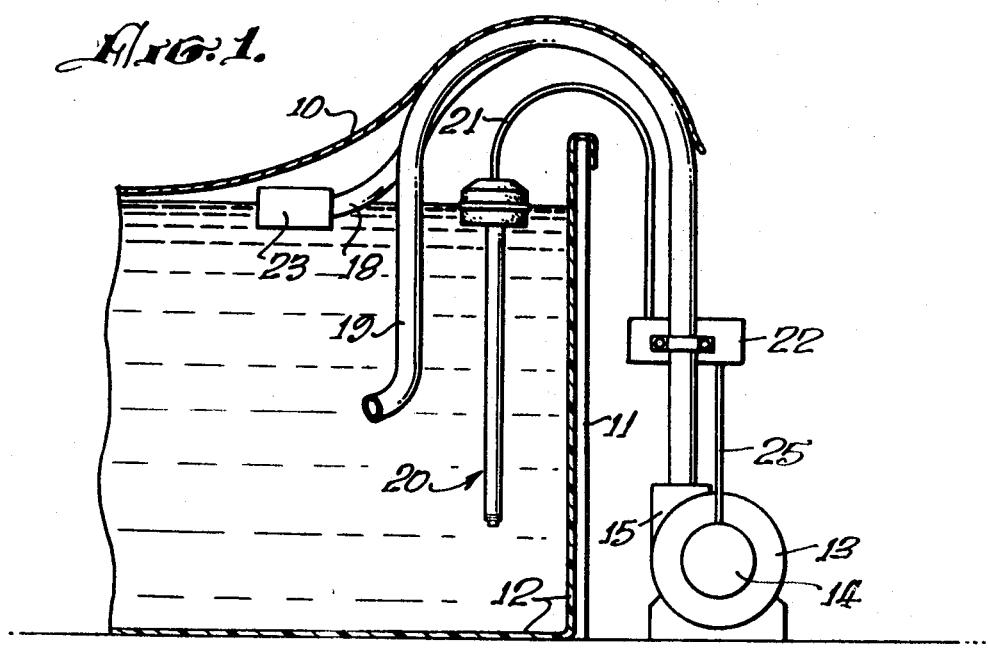
FIG. 1 is a schematic sectional elevation of a preferred embodiment of the invention.

Referring more particularly to the drawings, FIG. 1 shows a floating pool cover 10 disposed over a self-supporting swimming pool having supporting frame 11 and pool liner 12. A pump 13, operated by electric motor 14, is shown connected to water filter unit 15, intake pipe 18, and outlet pipe 19. Intake pipe 18 is connected to a floating water intake filter or skimmer 23 to skim off surface debris. A differential temperature sensing probe 20 is electrically connected through line 21 to electrical circuitry in box 22, which circuitry is in turn electrically connected through line 25 to electric motor 14.

Figure 2:
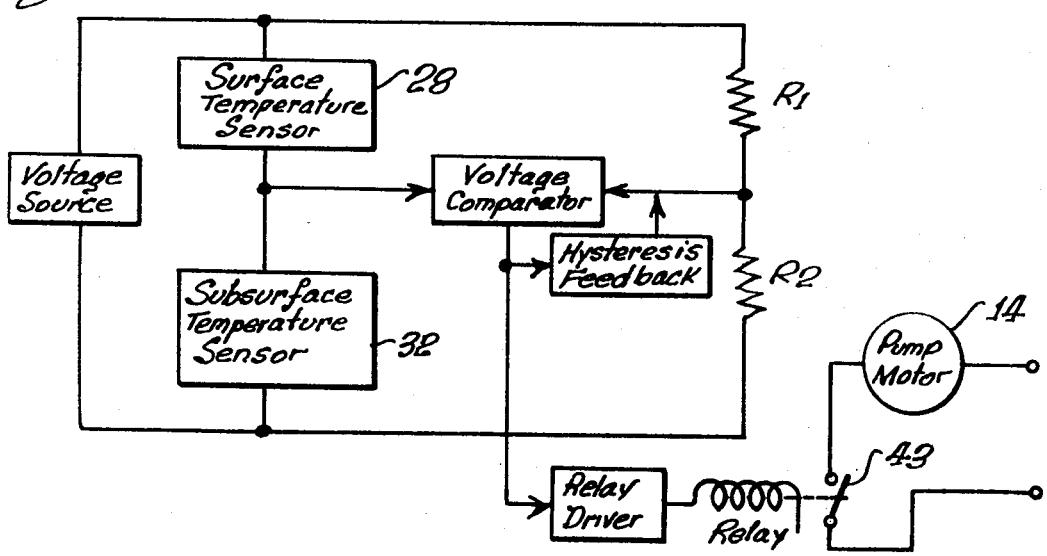
FIG. 2 is a block diagram of the electrical circuitry portion of the invention.

FIG. 2 shows a block diagram of the electrical circuitry portion of the invention, with each of the blocks being labeled as to function. The surface temperature sensor and subsurface temperature sensor are, in the preferred embodiment disclosed herein, temperature sensitive resistors. The circuitry is the standard and well-known balanced bridge circuit, with the output from the bridge circuit being used to close, or open, a relay. The relay, in response, turns the electric pump motor 14 on or off.

FIG. 3 shows the temperature sensing probe 20 as being comprised of a float element 26 and a length of plastic pipe 27. Pipe 27 contains an electrical resistor 28 wound on a bobbin 29, and located in the upper end of pipe 27, and electrical resistor 32 wound on a bobbin 33, and located in the lower end of pipe 27. A potting compound 34 is used inside pipe 27 to secure everything in place. A support cord or rope 35, and electrical lines from the resistors, are also imbedded in the potting compound and emerge from the probe unit through water proof line 21. Float element 26 contains a heat conducting flange 36. A method of adjusting buoyancy of the probe unit is provided by plug 39 containing threaded hole 40, and screw 41 with washers 42.

Turning now to a more detailed discussion of the apparatus, reference is again made to the temperature sensing probe 20 as shown in a preferred embodiment in FIG. 3. More precisely, the probe is a device for sensing or detecting temperature "differences," and could more accurately be called a "differential" temperature sensing probe. The probe unit 20 is placed in the water of the swimming pool and the float element 26, which can be styrofoam or the like, causes the unit to float vertically in the water. The float element, however, should have a low thermal conductivity, but most suitable float materials meet that requirement.

The position of the probe unit relative to the surface of the water is adjusted by adding or subtracting washers 42 at the lower end of the unit, until flange 36, in the float element 26, is just at the water surface. The pool cover 10 is then placed over the pool and the probe 20, as shown in FIG. 1. The pool cover should be dark in color to readily absorb solar heat energy and, by conduction, transmit heat to the surface of the pool on which the cover is floating. The pool cover can be plastic or the like.

Flange 36 in the float element is constructed from a high thermal conductivity metal such as aluminum. Flange 36 is exposed at its periphery to water right at the surface of the pool and the flange assumes the same temperature as the surface water. Electrical resistors 28 and 32 are temperature sensitive resistors, and resistor 28 is opposite flange 36 to detect the temperature of the surface water in the pool. Resistor 32 is deep in the pool to detect subsurface water temperature. These resistors act, then, as a "surface temperature sensor" and a "subsurface temperature sensor."

These two temperature sensors are constructed from electrically resistive wire wound on bobbins, with the coils of wire firmly contacting the interior wall of pipe 27 to provide good temperature pickup, as shown in FIG. 3. The resistance wire chosen should have a relatively large temperature coefficient, and it should be the same for both resistors over the temperature range likely to be experienced by the pool water, such as a range of 32 degrees Fahrenheit to 95 degrees Fahrenheit. A suitable material for this purpose has been found to be a resistance wire which is an alloy of 70 percent nickel and 30 percent iron, having the trade name "Balco," and produced by Wilbur B. Driver Co. of Newark, N.J.

To insure a close match of temperature coefficients between the two resistors 28 and 32, a given pair of resistors should be wound consecutively from wire from the same supply spool. A typical pair of resistors would use a wire diameter of 0.00275 inches and each resistor would have a resistance of approximately 7000 ohms. The potting compound 34 shown in FIG. 3, which secures the resistors in place in pipe 27, should have a low thermal conductivity.

The electrical circuitry in which resistors 28 and 32 are connected is shown in FIG. 2. This circuitry, with the exception of resistors 28 and 32 and the pump motor, is physically located in box 22 shown in FIG. 1. The circuitry is the well known balanced bridge circuit. In the bridge circuit shown, the voltages across the surface temperature sensor and subsurface temperature sensor, resistors 28 and 32, are compared with voltages occurring across two reference resistors R1 and R2. Reference resistors R1 and R2 should have a low temperature coefficient and be physically located near each other so that they are always the same temperature. The voltage at the junction of R1 and R2 will then be a fixed percentage of the voltage provided by the Voltage Source.

When temperature sensitive resistors 28 and 32 are at the same temperature, then the voltage at their junction will also be a fixed percentage of the voltage provided by the Voltage Source. However, if the surface temperature sensor, resistor 28, becomes warmer than the subsurface temperature sensor, resistor 32, the voltage at the juncture of the resistors 28 and 32 will change, and the voltage comparator will detect this change relative to the voltage at the junction of R1 and R2.

The ratio of R1 and R2 is so selected that when the surface temperature sensor has its temperature raised at least 1 or 2 degrees higher than the temperature of the subsurface temperature sensor then the voltage comparator will activate the relay driver, closing the relay switch 43, which turns on the pump motor 14.

As illustrated by FIG. 1, the pump 13 when activated by motor 14 will draw water from the surface of the pool through water intake line 18, through the usual filter 15, and will expel the water to subsurface areas, causing circulation in the pool. When the surface temperature and subsurface temperature becomes essentially the same, resistors 28 and 32 will detect this, the bridge circuit will return to its original condition, the relay switch 43 will open, and the pump motor will be turned off.

The circuit is such that the relay switch 43 is caused to close and turn on the pump only when the surface temperature sensor detects a temperature higher than that detected by the subsurface temperature sensor, i.e., a "positive" temperature difference between surface and subsurface water. If the surface water becomes cooler than subsurface water, due to falling air temperatures, the coming of night, or the like, causing a "negative" temperature difference, the bridge circuit merely becomes unbalanced in the opposite direction and the relay switch 43 remains open and the pump remains turned off.

The hysteresis feedback shown in FIG. 2 is a standard method of giving stability, which in this case is to prevent possible electrical "noise" from causing the pump motor to turn on and off rapidly, and also to insure some minimum motor run time once it is turned on.

The ability of this system to sense very small temperature differences permits it to start the mixing action of the pump a relatively short time after heating of the pool surface begins. This minimizes heat loss due to radiation or convection at the heated surface of the pool. The system is also automatically controlled by temperature differences in the pool, not by time clock or manually operated switch, the latter two methods frequently causing a pool to actually cool off when the pool surface or cover is not in fact being heated but is being cooled. Of course, for pool cleaning or other purposes, switch 43 can be manually operated, or a separate manual switch can be installed, to provide manual control of the pump motor.

Although specific embodiments of the present invention have been described and illustrated, it is to be understood that the same are by way of illustration and example and that the invention is not limited thereto, as variations may be readily apparent to those versed in the art, and the invention is to be given its broadest possible interpretation:

I claim:

1. In a solar heating system for swimming pools, the combination comprising: a pool cover disposed over the pool to absorb heat energy and conduct same to surface water in the pool by conduction, electrically responsive pump means for circulating water in the pool and creating a substantially even water temperature throughout the pool, sensing means for sensing temperature differences between surface and subsurface water in the pool, said sensing means electrically connected to said pump means, said sensing means providing electrical signals activating the pump means when positive temperature differences occur between surface and subsurface water in the pool, and inactivating the pump means when there are no positive temperature differences between surface and subsurface water in the pool.

2. The combination defined in claim 1, wherein said sensing means includes a differential temperature sensing probe, said probe containing electrical circuitry including a first temperature sensitive element to sense surface water temperature and a second temperature sensitive element to sense subsurface water temperature.

3. The combination defined in claim 2, wherein said differential temperature sensing probe is substantially cylindrical in shape and has a float element affixed thereto causing the probe to float vertically in water with the upper end thereof in the area of surface water and the lower end thereof in the area of subsurface water, said first temperature sensitive element being disposed in the upper end of the probe, and said second temperature sensitive element disposed in the lower end of the probe.

4. The combination defined in claim 3, wherein said float element has a low thermal conductivity and is disposed around said probe at the upper end thereof, said float element including a heat conductive flange protruding exteriorly of said float element to contact surface water, and said flange contacting said probe to conduct surface water temperature through the float element to the probe, and said first temperature sensitive element disposed in said probe opposite said heat conductive flange to thereby detect the temperature of surface water.

5. The combination defined in claim 2, wherein said first and second temperature sensitive elements are electrical resistors.

6. The combination defined in claim 3, wherein each of the first and second temperature sensitive elements are coils of electrical resistance wire wound on a bobbin.

7. The combination defined in claim 1, wherein said sensing means includes a balanced bridge circuit having a first temperature sensitive element subjected to surface water temperature, and a second temperature sensitive element subjected to subsurface water temperature, the electrical output of the balanced bridge circuit operating a switch, and said switch connecting electrical power to the pump means when positive temperature differences occur between surface and subsurface water in the pool, and disconnecting the electrical power from the pump means when there is no positive temperature difference between surface and subsurface water in the pool.

8. The combination defined in claim 1, wherein said pump means includes a surface water intake element connected to a water filter, an electrically driven pump, and a subsurface water outlet, operation of said electrically driven pump circulating surface water to subsurface areas.